June 9, 1931.   W. KÜHNERT ET AL   1,809,713
MICROPHONE
Filed Jan. 7, 1927
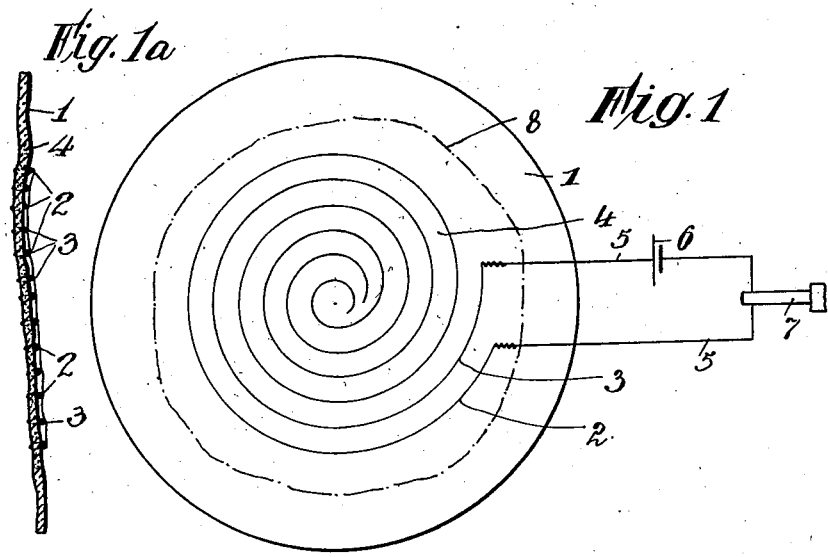
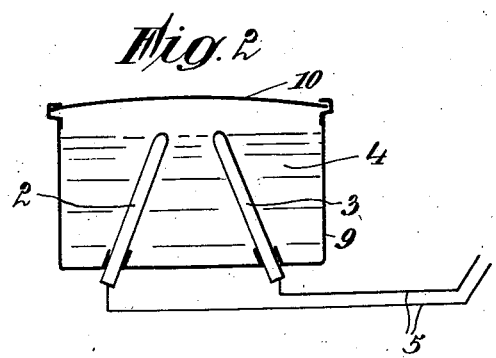
INVENTORS
Walter Kühnert & Max Maurer
by Langner, Parry, Card & Langmur
Attys.

Patented June 9, 1931

1,809,713

UNITED STATES PATENT OFFICE

WALTER KÜHNERT, OF VIENNA, AND MAX MAURER, OF KLOSTERNEUBURG, AUSTRIA

MICROPHONE

Application filed January 7, 1927, Serial No. 159,701, and in Austria April 16, 1926.

Our invention relates to microphones and has for its object to provide microphones which are not only cheap in construction, but also ensure a very clear reproduction of sounds in telephones and are durable and more particularly resist for a long time the action of either fresh or salt water, so that they may be safely used even under water.

Our invention is based on a discovery which will now be described with reference to Fig. 1.

With this object in view our invention consists of a microphone comprising a carrier, two conductors mounted in such carrier substantially immovable relative to each other, a circuit electrically connected with one end of each of the conductors, a source of electricity, a device responding to undulating currents of sound frequency included in such circuit, and an electrolyte in contact with the said two conductors.

In the annexed drawings Fig. 1, already mentioned, shows diagrammatically one constructional form of our improved microphone. Figs. 2 and 3 illustrate modifications thereof.

Two electric conductors such as spirally wound wires immovable relative to each other are shown at 2 and 3 as being secured for instance to a rigid frame 1. A solid, liquid, or semiliquid electrolyte 4 is arranged in contact with the conductors 1 and 2, while circuit 5 is shown including a source of electricity 6 and a telephone 7. This circuit is electrically connected with one end of the conductors 1 and 2, the other ends of which are out of contact with each other. If sound waves reach the system, consisting of the two conductors and the electrolyte in contact therewith, the sound is heard in the telephone.

The frame 1 in Fig. 1 may consist of a piece of felt, fabric, paper or other absorbent material soaked with liquid electrolyte such as a solution of a salt in water or of acidulated water with or without the addition of a liquid such as glycerine for preventing drying. It is also contemplated that the said piece of fabric, felt or paper may be coated with some solid electrolyte such as iodide of silver. The conductors 2 and 3 are in the form of wires sewn or otherwise attached to the frame 1 so that they are in contact with the electrolyte 4. The wires are preferably wound in equidistant spirals as shown in Fig. 1. Preferably the central part of the frame 1, within the broken line 8 is soaked with the liquid electrolyte or coated with the solid electrolyte.

The source of electricity 6 may be of any construction which will not produce alternating or undulating currents of sound frequency. Preferably galvanic elements or high frequency current generators are used as a source of electricity. If the microphone has to be used while immersed in sea water or when the conductors are immersed in an electrolyte, the two conductors 2 and 3 may be made of different metals so, that they themselves constitute a galvanic element in connection with the sea water or electrolyte into which they are immersed. The device responding to alternating currents of sound frequency may be a telephone 7 or the primary of a transformer for stepping up the alternating or undulating current flowing through the circuit 5; the secondary of the transformer may be connected to amplifiers in any desired manner, and the resulting current may either operate a telephone or a relay for operating any signalling apparatus.

In Fig. 2 the frame consists of a receptacle 9 containing the electrolyte 4 and the two conductors 2 and 3 which in this case may be in the form of pencils as shown, or in the form of metal grids. The side of the receptacle exposed to the action of the sound waves is formed by an elastic diaphragm which, however, is not in contact with the electrolyte.

We wish it to be understood that we do not limit ourselves to the details of the apparatus as herein described and shown as these may vary within wide limits without departing from the essence of our invention.

As far as can be concluded from many elaborate experiments it is the contact layer or film between the metallic electrodes and the electrolyte of the microphone above described that is affected by the incoming sound waves in such manner that the electric resistance of this contact layer or the transition resistance between the metallic electrode and the electrode varies with the variations of pressure due to the incoming sound waves. Consequently, in the above microphone an electric current is set up which varies in intensity exactly in accordance with the incoming sound waves, whereby the telephone connected to the said microphone is caused to reproduce the said sound waves clearly and exactly.

What we claim is:

1. In an apparatus for transforming sound waves into variations of electric current, the combination of two electrodes mounted on a carrier at a fixed distance from each other, and an electrolyte in contact with the said two electrodes and forming a path of constant cross section for the current from one electrode to the other, the length of such current path being altered by the incoming sound waves during the action of the device.

2. In an apparatus for transforming sound waves into variations of electric current, the combination of two electrodes mounted on a carrier at a fixed distance from each other and a liquid electrolyte in contact with the said two electrodes and forming a path of constant cross section for the current from one electrode to the other, the length of such current path being altered by the incoming sound waves during the action of the device.

3. In an apparatus for transforming sound waves into variations of electric current, the combination of two electrodes mounted on a carrier at a fixed distance from each other such carrier consisting of an absorbent material soaked with a liquid electrolyte in contact with the said two electrodes and forming a path of constant cross section for the current from one electrode to the other, the length of such current path being altered by the incoming sound waves during the action of the device.

4. In an apparatus for transforming sound waves into variations of electric current, the combination of two electrodes mounted on a carrier at a fixed distance from each other, such carrier consisting of textile fibres soaked with a liquid electrolyte in contact with the said two electrodes and forming a path of constant cross section for the current from one electrode to the other, the length of such current path being altered by the incoming sound waves during the action of the device.

5. In an apparatus for transforming sound waves into variations of electric current, the combination of two electrodes mounted on a carrier at a fixed distance from each other, such carrier consisting of absorbent material soaked with a liquid electrolyte mixed with a hygroscopic liquid, such electrolyte being in contact with the said two electrodes and forming a path of constant cross section for the current from one electrode to the other, the length of such current path being altered by the incoming sound waves during the action of the device.

6. In an apparatus for transforming sound waves into variations of electric current, the combination of two electrodes in the form of equidistant spirals mounted on a plane carrier at a fixed distance of each other, such carrier consisting of an absorbent material soaked with a liquid electrolyte in contact with the said two electrodes and forming a path of constant cross section for the current from one electrode to the other, the length of such current path being altered by the incoming sound waves during the action of the device.

In testimony whereof we have signed our names to this specification.

WALTER KÜHNERT.
MAX MAURER.